(12) United States Patent
Botello et al.

(10) Patent No.: US 9,657,890 B2
(45) Date of Patent: May 23, 2017

(54) COOPERATIVELY COUPLED HOLDING SYSTEM AND METHOD

(71) Applicants: Javier Botello, Benbrook, TX (US);
Kara M. Botello, Benbrook, TX (US);
Manuel Botello, Donna, TX (US)

(72) Inventors: Javier Botello, Benbrook, TX (US);
Kara M. Botello, Benbrook, TX (US);
Manuel Botello, Donna, TX (US)

( * ) Notice: Subject to any disclaimer, the term of this patent is extended or adjusted under 35 U.S.C. 154(b) by 59 days.

(21) Appl. No.: 14/196,075

(22) Filed: Mar. 4, 2014

(65) Prior Publication Data
US 2014/0252820 A1 Sep. 11, 2014

Related U.S. Application Data

(60) Provisional application No. 61/772,871, filed on Mar. 5, 2013.

(51) Int. Cl.
| A47F 7/28 | (2006.01) |
| F16M 13/02 | (2006.01) |
| A47G 23/02 | (2006.01) |
| A47C 7/68 | (2006.01) |
| A47F 5/08 | (2006.01) |
| A47B 96/06 | (2006.01) |
| A47G 7/04 | (2006.01) |

(52) U.S. Cl.
CPC ............ *F16M 13/02* (2013.01); *A47B 96/067* (2013.01); *A47C 7/68* (2013.01); *A47F 5/0846* (2013.01); *A47G 23/0225* (2013.01); *A47F 7/285* (2013.01); *A47G 7/044* (2013.01); *Y10T 29/49826* (2015.01)

(58) Field of Classification Search
USPC ........... 211/94.01, 75, 193, 106.01; 220/740, 220/737; 248/311.2, 312, 312.1, 318
See application file for complete search history.

(56) References Cited

U.S. PATENT DOCUMENTS

| 2,406,334 | A | * | 8/1946 | Keller et al. ............... 248/311.2 |
| 2,926,879 | A | | 3/1960 | Dietrich |
| 4,215,840 | A | * | 8/1980 | Babberl ................... 248/220.22 |
| 4,858,869 | A | | 8/1989 | Stang |
| 5,328,143 | A | | 7/1994 | Koorey et al. |
| 5,342,009 | A | | 8/1994 | Lehner |
| 5,807,047 | A | * | 9/1998 | Cox .............................. 410/152 |
| 5,865,411 | A | | 2/1999 | Droste et al. |

(Continued)

*Primary Examiner* — Alfred Wujciak
(74) *Attorney, Agent, or Firm* — Decker Jones P.C.; Brian K. Yost; Geoffrey Mantooth (57) ABSTRACT

A holder comprising a connecting portion, an extension portion, and a receptacle; the connecting portion comprising a generally rectangular piece of material generally conforming to the shape of a channel; the connecting portion comprising an upper portion comprising a spring element biased in an expanded position such that connecting portion vertical dimensions may be reduced to fit within the channel, and upon insertion within the channel expanded to fill the space; a lower portion of the connecting portion being angled to permit easier insertion with the channel; the extension portion is pivotally attached to the connecting portion; and the receptacle comprising a base portion may be cooperatively coupled to a lower surface of the extension portion such that the holder may be collapsed when not in use.

1 Claim, 8 Drawing Sheets

(56) References Cited

U.S. PATENT DOCUMENTS

| | | | |
|---|---|---|---|
| 6,364,141 B1 * | 4/2002 | Ehrgott | 211/189 |
| 6,591,541 B1 | 7/2003 | Cummings | |
| 7,172,164 B2 | 2/2007 | Fuelling et al. | |
| 7,341,231 B2 | 3/2008 | Zarn | |
| 7,677,407 B2 | 3/2010 | Davis | |
| 8,061,671 B2 | 11/2011 | Mahaffy | |
| 8,066,148 B2 | 11/2011 | Garahan | |
| 8,070,378 B2 | 12/2011 | Gargaro, III et al. | |
| 8,245,894 B2 | 8/2012 | Buehler | |
| 8,662,322 B2 * | 3/2014 | Magnusson et al. | 211/70.6 |
| 2010/0084531 A1 * | 4/2010 | Schuchman | 248/311.2 |
| 2010/0170925 A1 | 7/2010 | Osten et al. | |
| 2011/0109129 A1 | 5/2011 | Brill | |

* cited by examiner

COOPERATIVELY COUPLED HOLDING SYSTEM AND METHOD

COOPERATIVELY COUPLED HOLDING SYSTEM AND METHOD of which the following is a specification. This application claims the benefit of provisional application Ser. No. 61/772,871 filed Mar. 5, 2013, the contents of which are incorporated by reference herein its entirety.

BACKGROUND OF THE INVENTION

1. Field of the Invention

The present invention generally relates to a device and system for holding an object such as a beverage, and specifically to a system and method comprising a holding device that may be cooperatively coupled to a channel.

2. Background of the Invention

It is often desirable to temporarily position objects such as beverages, personal data devices (PDA's), keys, wallets, food items, and the like. For example, spectators at many sporting arenas and venues enjoy beverages and snacks while taking in an event. Some venues have beverages holders fixed in position for the spectator to place a drink or food item such as peanuts and popcorn. However, some venues do not provide such conveniences. In such venues, there are often wooden or metal bleachers. Most bleachers are fairly simple and comprise a seat and sometimes a backrest. Some bleachers comprise a backrest having a channel which is used during the original assembly of the bleachers to secure the backrest to the seat. These channels may have a variety of configuration. One common configuration is a "C" shaped channel.

The present disclosure provides a holder which may be cooperatively coupled to a channel such as those channels found on the backs of bleachers. This holder may be used to hold a beverage, a cell phone and other items commonly carried to sporting events.

The holder is not limited to being attached to a bleacher "C" channel. Nor is the holder limited for use with beverages and food items. Rather, the holder is equally well suited to be attached to different shaped channels in different environments. In some embodiments, the channel may be attached to a surface such as a wall and the holder may be attached to this channel to secure objects such as tools. In this embodiment, for example, the channel may be mounted to wall of a garage. One or more holders may then be inserted within the channel to hold such tools as screw drives, pliers, hammers, and the like.

In other embodiments, the channel can be mounted to a kitchen wall and the holder may form a shelf for display or positioning of such objects as china, dishes, glasses, cups, saucers, and the like.

The holder comprises a connecting portion, an extension portion, and a receptacle. The connecting portion comprises a generally rectangular piece of material generally conforming to the shape of a channel such as a bleacher "C" channel. The connecting portion comprises an upper portion which has a spring element biased in an expanded position such that the connecting portion vertical dimensions may be reduced to fit within the channel and upon insertion within the channel expanded to fill the space. A lower portion of the connecting portion is angled to permit easier insertion with the channel. The extension portion is pivotally attached to the connecting portion. The receptacle may be formed from a mesh or fabric, or a flexible more rigid material such as leather, plastic, vinyl, and the like. A base portion may be cooperatively coupled to a lower surface of the extension portion such that the holder may be collapsed when not in use.

3. Description of the Prior Art

A number of patents and patent publications teach holders which are collapsible or may be attached to objects. For example, U.S. Pat. No. 2,926,879 to Dietrich teaches an apparatus for holding tumblers. The apparatus comprises a support bracket having a C shaped channel (when viewed from above) in which a mounting portion is provided with a round stud portion at top back; and having a support portion for the tumbler to be attached to the mounting portion, to allow the rotation of support portion to ensure support portion to remain in an upright position. U.S. Pat. No. 4,858,869 issued to Stang teaches an apparatus for attaching a cup to a base surface. The apparatus comprises an insertion tab attached to a cup, the insertion tab may be inserted within mounting receptacle for releasably mounting the cup. U.S. Pat. No. 5,328,143 to Koorey 1994 teaches an apparatus for holding a beverage container with a promotional display. The apparatus consists of an outer ring and inner ring that are pivotally mounted to a body by a pin, either large or small beverage containers may be supported by the inner and outer rings members; a finger mounted on the body holds the container or holds the inner ring member in a retracted position when not in use, and a tab on the lower portion of the body holds the outer ring member in the retracted position when not in use U.S. Pat. No. 5,342,009 to Lehner teaches an apparatus for holding drink containers. The apparatus consists of a fastening panel and a tray supported thereto to be retracted or folded out to receive a drink container; the tray and the holder are connected with each other by a connecting lever in order that the folded-out movement and the retracting movement are fluid; in its retracted position, the holder is covered by the tray. U.S. Pat. No. 5,865,411 to Droste teaches a removable apparatus for holding beverage containers, drinking vessels or the like, especially in motor vehicles. The apparatus consists of a fastening component, an upper receiving element and a lower support, with a connecting arm, extended between the upper and lower elements; the upper and lowered arms are made foldable and movable from the unfolded use position to a folded resting position within the receiving element. U.S. Pat. No. 6,591,541 to Cummings teaches an apparatus for holding fishing tackle. The apparatus consists of a channel lipped edges attached to a base, a mounting bracket having a round base portion or diamond-shaped portion for slideably mounting within the channel, a fastener to hold the mounting bracket in the channel, with locking means to lock the barrel sleeve for the fishing tackle in place.

U.S. Pat. No. 7,172,164 to Fuelling teaches an apparatus for holding modular accessories on vehicles. The apparatus consists of a receiver with vertical slots and tapering side walls; a separate plate which slides in the slot on the receiver and is compatible with mounting modular accessories, fishing accessories and the like, with a locking device optionally provided. U.S. Pat. No. 7,341,231 to Zarn teaches an apparatus for an accessory mounting system for a boat. The apparatus consists of a slide connector having a first portion which mounts within the track and an outside portion that projects outwardly from the track to connect with various accessories used in boating. U.S. Pat. No. 7,677,407 to Davis teaches an apparatus consisting of an insulated beverage holder with vertical bracket and flat storage method. The apparatus consists of a flexible foldable cylindrically-shaped insulated sleeve with a seam that includes a piping or welt material; the seam is able to slide into a mountable channel mounted to any flat vertical surface, and when empty, the beverage holder is foldable and able to be stored. U.S. patent Ser. No. 10/8,061,671 to Mahaffy teaches an apparatus used as a receptacle and adjustable to position any accessory in a passenger vehicle. The apparatus consists of a C shaped channel portion of varying lengths attached to stable locations in a vehicle and a removable accessory; the channel portion comprises an upper portion and a lower portion which defines the channel; a connector to engage the channel portion and attach to and support the accessory. U.S. Pat. No. 8,066,148 to Garahan teaches a portable beverage container consisting of a basket suspended from a holder which is attached to a slideable attachment or strap for use in attaching the beverage holder to other stable objects; the beverage holder may be configured to fold into less volume when not in use. U.S. Pat. No. 8,070,378 to Gargaro teaches and apparatus for a channeled track connector. The apparatus consists of a C shaped track connector having a base with openings at either end for the engaging of a slider; the slider employees a foot to connect with the base and serves as a mount for predefined objects.

U.S. Pat. No. 8,245,894 to Buehler teaches an apparatus for a cup holder attached to a shopping cart and retracts into the basket of the shopping cart. The apparatus consists of a top portion and a bottom portion, with a top ring coupled to the top portion and a base coupled to the bottom portion; a strut is extended between the top ring and the base and the strut can rotate to extend upward and collapse the holder when it is not in use. Osten, patent publication no. US 2010/0170925 teaches an apparatus for an accessory holder for bicycle handlebars. The apparatus comprises a base to attach the holder to the handlebars that receives two or more general-purpose clips associated with portable accessories or a cup holder consisting of a hoop and being attachable to additional hoops, said hoops being stackable. Brill, patent publication no. US 2011/0109129 teaches an apparatus comprising an attachment element designed as a carrier rail and adapted to slideably secure items to the attachment element.

However all of the aforementioned devices fail to provide a versatile device which may be used to hold a variety of objects in a variety of environments.

What is needed is a device and system which is collapsible, versatile, easily attachable and removable, which may be used to hold a variety of objects. The present disclosure provides such a device and system.

SUMMARY OF THE INVENTION

The present disclosure provides a cooperatively coupled holding system and method in which a holding device may be cooperatively coupled to a channel such as those channels found on the backs of bleachers. In certain embodiments, the holder may be used to hold a beverage, a cell phone and other items commonly carried to sporting events.

The system comprises a holder portion and a channel portion. The holder comprises a connecting element, an extension element, and a receptacle. The connecting element comprises a generally rectangular piece of material generally conforming to the shape of a channel. In the preferred embodiment, channel is a "C" channel. The connecting portion comprises an upper portion which has a spring element biased in an expanded position such that the connecting portion vertical dimensions may be reduced to fit within the channel and upon insertion within the channel expanded to fill the space. A lower portion of the connecting portion is angled to permit easier insertion with the channel. The extension portion is pivotally attached to the connecting portion. The receptacle may be formed from a mesh or fabric. A base portion may be cooperatively coupled to a lower surface of the extension portion such that the holder may be collapsed when not in use.

The holder is not limited to being attached to a bleacher "C" channel. Nor is the holder limited for use with beverages and food items. Rather, the holder is equally well suited to be attached to different shaped channels in different environments. In some embodiments, the channel may be attached to a surface such as a wall and the holder may be attached to this channel to secure objects such as tools. In this embodiment, for example, the channel may be mounted to wall of a garage. One or more holders may then be inserted within the channel to hold such tools as screw drives, pliers, hammers, and the like.

In other embodiments, the channel can be mounted to a kitchen wall and the holder may form a shelf for display or positioning of such objects as china, dishes, glasses, cups, saucers, and the like.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention.

DESCRIPTION OF THE PREFERRED EMBODIMENT

Referring to FIGS. 1-8 a cooperatively coupled holding system 12 is shown. In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. In the drawings, similar reference numbers are used for designating similar elements throughout the several drawings.

The following describes particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A. B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

The examples and illustrations of a cooperative holding device are described herein with respect to mounting to and holding certain objects However, the inventive system is equally applicable for use with other surfaces and for holding other objects. Moreover, while certain materials are discussed herein with respect to various components of the various embodiments, the embodiments are not limited to such materials. For example, in a preferred embodiment, certain components are formed from plastic. However, the components of the device may comprise any suitable materials without departing from the scope and spirit of this disclosure.

Referring to FIGS. 1-4 a preferred embodiment of the system 12 comprises a holder portion 14 and a channel portion 16. The holder 14 comprises an insertion assembly 18 and an extension assembly 20. In the preferred embodiment, the insertion assembly 18 comprises a generally rectangular arrangement comprising a slideable portion 22 and a fixed portion 24. The slideable portion 22 and fixed portion 24 share a central vertical axis such that the slideable portion 22 is arranged to slide along this axis in a generally vertical direction with respect to the fixed portion 24. In the preferred embodiment, the slideable portion 22 is positioned above the fixed portion 24. However, the slideable portion 22 need not be positioned above the fixed portion 24. Rather, the slideable portion 22 can be positioned below the fixed portion 24 or, depending upon the channel 16 arrangement, side by side to the fixed portion 24 or in other suitable relative positions without departing from the scope and spirit of the invention.

Figure 5:
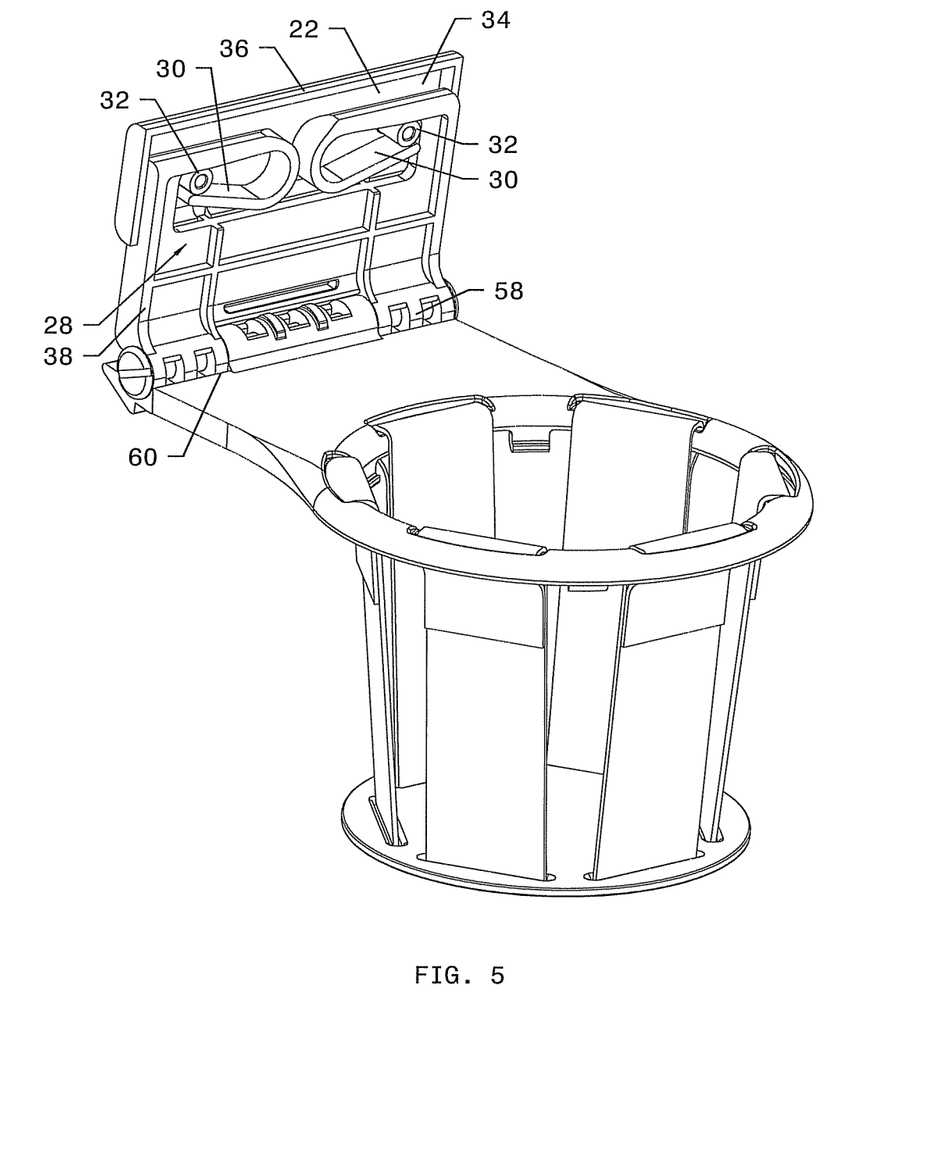
FIG. 5 is an isometric left, front, and top side view of the holder with the front face removed and depicting the spring arrangement in accordance with a preferred embodiment.

The slideable portion 22 of the preferred embodiment slides along one or more sliding members 26 of the fixed portion 24. In the preferred embodiment, such sliding members 26 comprise sides 26 of the fixed portion 24 and two interior sliding members 26a positioned between the sides 26. Referring to FIG. 5, in the preferred embodiment, the spring arrangement 28 comprises two spring elements 30 comprising curved portions of material extending from an upper surface of the fixed portion. The curved portion of one spring element 30 generally forms an elongated "C" shape and the curved portion of the second spring element 30 generally forms a reverse "C" shape.

In the preferred embodiment, the fixed portion spring arrangement 28 is adapted to interact with the sliding portion 22. In this embodiment, respective spring engagement portions 32 project from an inside rear face 34 of sliding portion 22 so as to engage a lower portion of the respective spring element 30 such that downward movement (in relation to fixed portion 24) of the sliding portion 22 compresses each of the spring elements 30.

Figure 3:
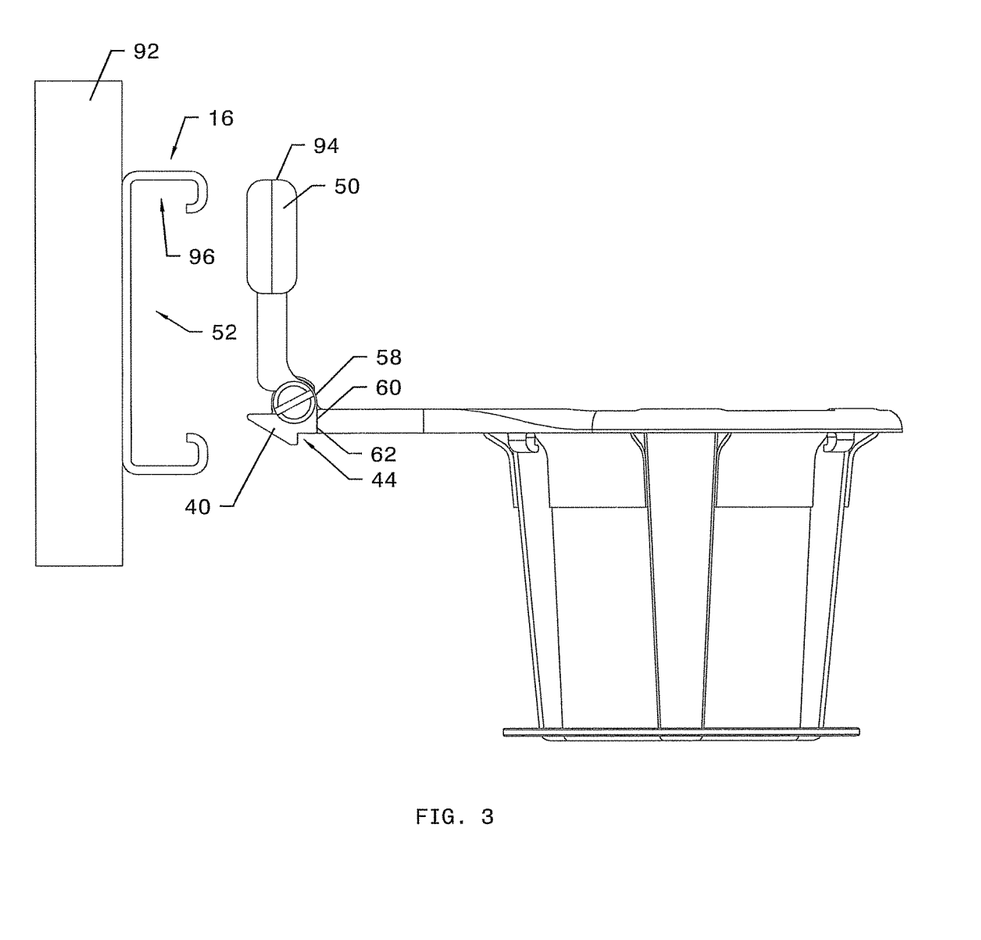
FIG. 3 is left side elevation view of the holder and mounting channel in accordance with a preferred embodiment.
Figure 4:
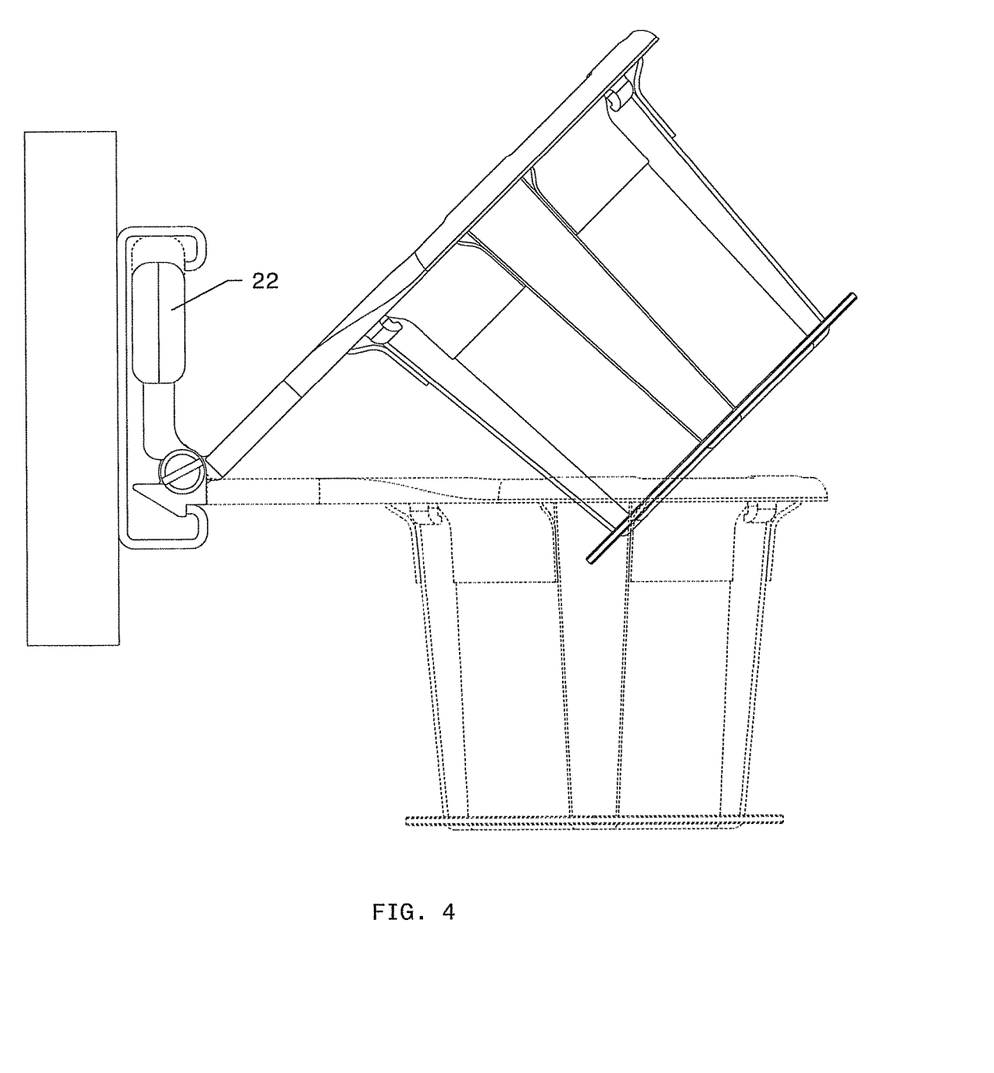
FIG. 4 is left side elevation view of the holder and mounting channel depicted in FIG. 3, with the holder positioned within the channel and pivoted upwardly.

As best shown in FIG. 4, the slideable portion 22 may be moved from an expanded position to a contracted position relative to the fixed portion 24. In the preferred embodiment, the sliding portion 22 is biased towards the expanded position, as shown, for example, in FIGS. 1 and 3. In the contracted position, the sliding portion 22 is moved against the spring arrangement 28 such that a top portion 36 (FIG. 5) of the sliding portion 22 moves closer to a lower portion 38 of the fixed portion 24, thus diminishing the vertical dimensions of the insertion portion 18. Of course, in embodiments in which the sliding 22 and fixed 24 portions are arranged in other than a vertical arrangement, the sliding action will reduce the outer dimensions of the insertion portion 18 with respect to the direction of movement.

Although in the preferred embodiment the fixed portion 24 comprises the spring arrangement 28, the spring arrangement 28 need not be positioned within the fixed portion 24. Rather than the fixed portion 24 comprising the spring arrangement 28, the sliding portion 22 can comprise the spring arrangement 28 without departing from the scope and spirit of the invention. Additionally, although in the preferred embodiment the spring arrangement 28 comprises spring elements 30 comprising curved portions extending from an upper surface of the fixed portion 24, other spring configurations 28 may be used. For example, coil springs, bell springs, leaf springs, and other conventional and commercially available springs can be positioned such that the sliding portion 22 can move relative to the fixed portion 24. Additionally, the insertion portion 18 can comprise a plurality of sliding portions 22 rather than a fixed portion 24 and a sliding portion 22. Therefore, for example, to be moved to a contracted position, an upper sliding portion 22 can slide downward while a lower sliding portion 22 slides upward.

In the preferred embodiment, the insertion portion 18 further comprises an angled member 40 at s base 42 of the insertion portion 18. As shown in FIGS. 1, 3, 4, & 8, such angled member 40 slopes rearward and upward with respect to the base 42. This angled member 40 acts as a ramp and permits the insertion member 18 to be easily inserted within the channel 16. As will be discussed in more detail below, and as shown in FIGS. 3 & 4, the angled member 40 facilitates transferring an inward insertion force upward such that the sliding member 22 moves to cause the insertion member 18 to become compressed as it (the insertion member 18) is moved horizontally to a desired position within the channel 16. When engaged within the channel 16, a notch 44 in a forward lower portion of the angled member 40 helps prevent the insertion portion 18 from becoming unintentionally dislodged from the channel 16. Rather, the insertion portion 18 is removed from the channel 16 by moving the sliding portion 22 with respect to the fixed portion 24 so as to reduce the vertical dimensions of the insertion portion 18 while at the same time using the rearward horizontal force (i.e. pulling force) to pull the insertion portion 18 away from the channel 16.

In the preferred embodiment there are two angled portions 40 on each side of the insertion portion 18. However, virtually any number of angled portions 40 may be used. For example, a single centrally positioned angled portion 40 may be used or multiple angled portions 40. Additionally, in the preferred embodiment, the angled portions 40 are positioned near the base 42 of the insertion portion 18. However, the angled portions 40 need not be so positioned. Rather, such angled portions 40 may be positioned at the opposite end of the base 42, or, depending upon the channel 16 arrangement, on one or both sides of the insertion portion 18 or in other suitable positions without departing from the scope and spirit of the invention.

The slideable portion 22 comprises front and back faces 46, 48 and sides 50. The insertion assembly 18, when inserted within channel 16, generally conforms to, as will be discussed in more detail below, an interior space 52 defined by the shape of the channel 16 such that the insertion assembly 18 may be inserted within the channel 16 space 52.

In the preferred embodiment, the insertion portion 18 is pivotally coupled to the extension assembly 20. The insertion portion 18 and extension assembly 20 comprise a cooperative canal arrangement through which a pivot pin 54 may be inserted. This cooperative canal arrangement 56 comprises a series of hollow retaining elements 56 positioned on edges of the insertion portion 18 and extension assembly 20. Each retaining element 56 defines a canal though which the pivot pin 54 may be inserted. As best shown in FIGS. 1, 2, 3 & 5, the insertion portion 18 retaining elements 56 define a curved outer surface 58 against which a rearward edge 60 of the extension assembly may move until coming flush with a flattened portion 62 of the insertion portion 18 retaining element 56. In the preferred embodiment, the insertion portion 18 comprises two outer retaining elements 56 and the extension assembly 18 comprises a centrally portioned retaining element 56. However, the retaining elements 56 may be positioned differently and more or fewer such elements 56 may be used without departing from the scope and spirit of the invention.

Figure 6:
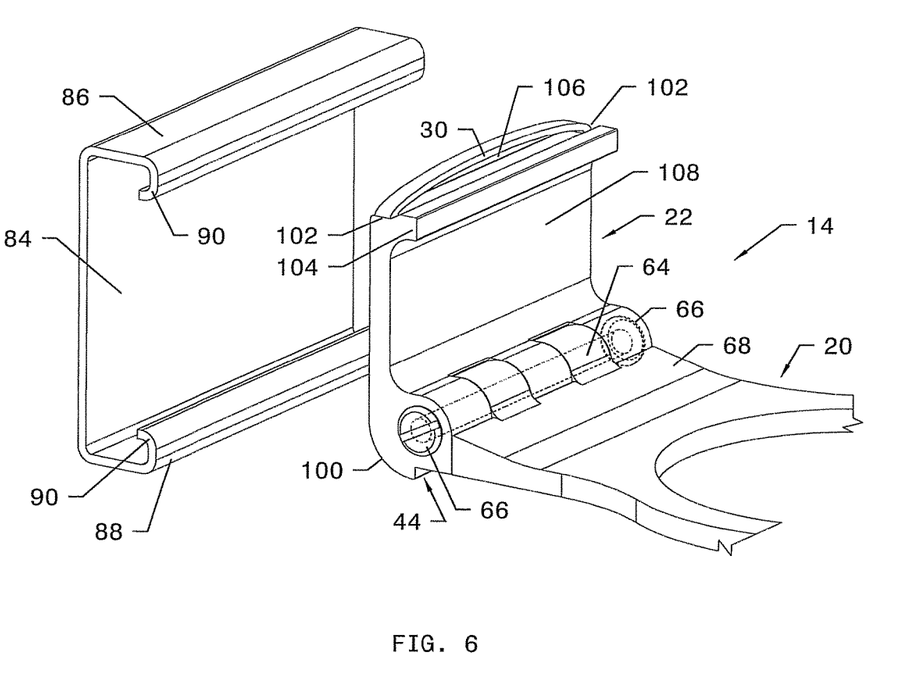
FIG. 6 is an isometric left, top, and front side view of the holder and mounting channel in accordance with another embodiment.

Referring to FIG. 6, the pivot pin 54 of a preferred embodiment comprises an elongated cylinder 64 and end caps 66. One or both of the end caps 66 may be threadedly coupled to the cylinder 64. As the end caps 66 have a diameter larger than a diameter of the cylinder 64, the extension assembly 20 may be adequately secured to the insertion portion 18 and permitted to pivot with respect to the insertion portion 18 such that the insertion portion 18 may be made to lay flat against an upper surface 68 of the extension portion 20. In the preferred embodiment, the cylinder 64 and end caps 66 are formed from aluminum. However, any suitable material such as steel or plastic may be used.

Figure 1:
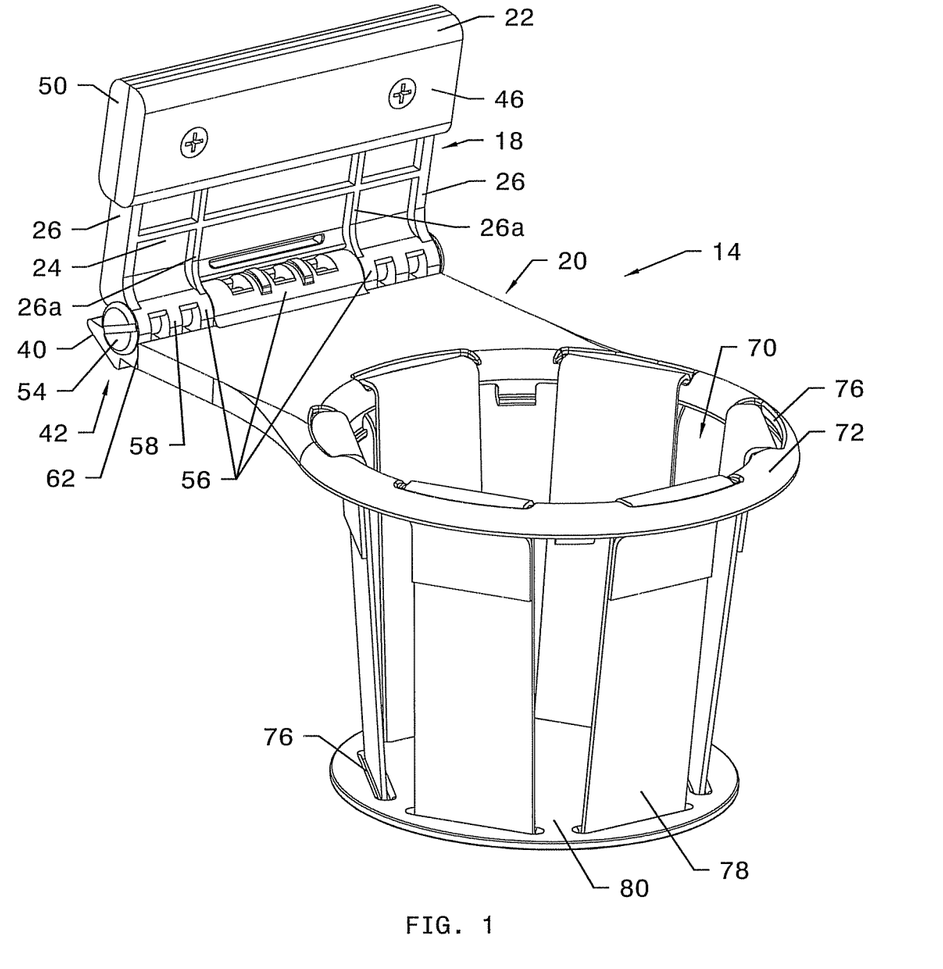
FIG. 1 is an isometric left, front, and top side view of the holder in accordance with a preferred embodiment.
Figure 2:
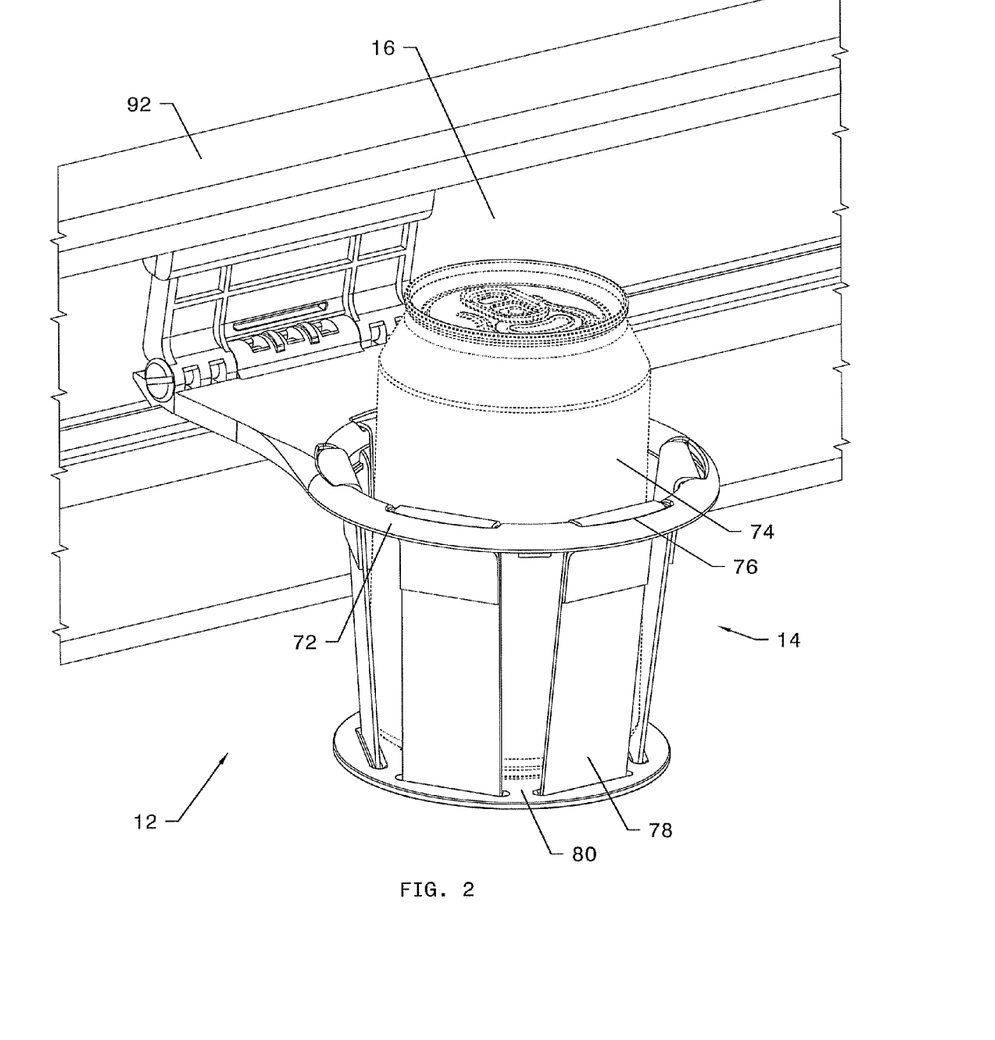
FIG. 2 is an isometric left, front, and top side view of the holder within a channel of a bleacher back with a beverage container depicted in phantom in accordance with a preferred embodiment.
Figure 7:
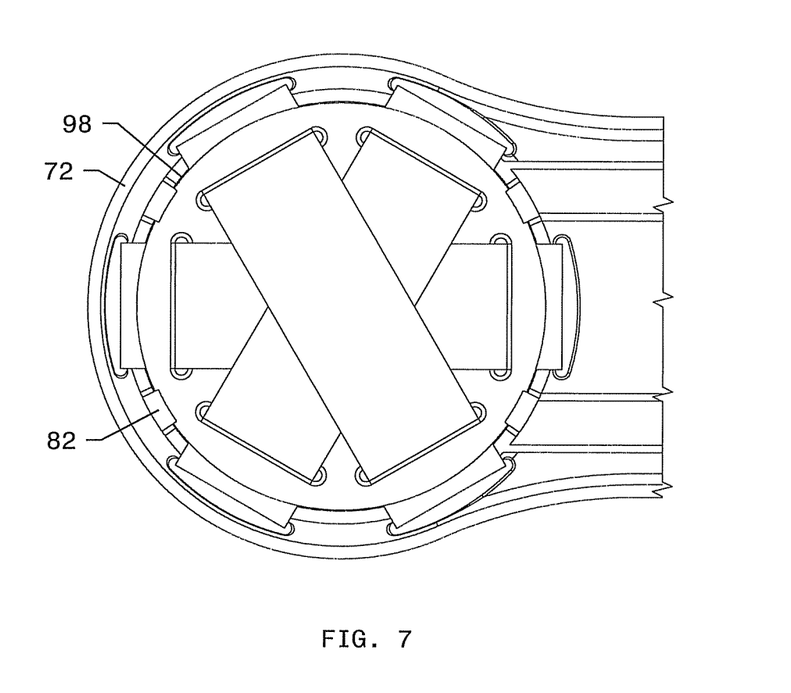
FIG. 7 is bottom elevation partial view of the holder in a collapsed position in accordance with a preferred embodiment.
Figure 8:
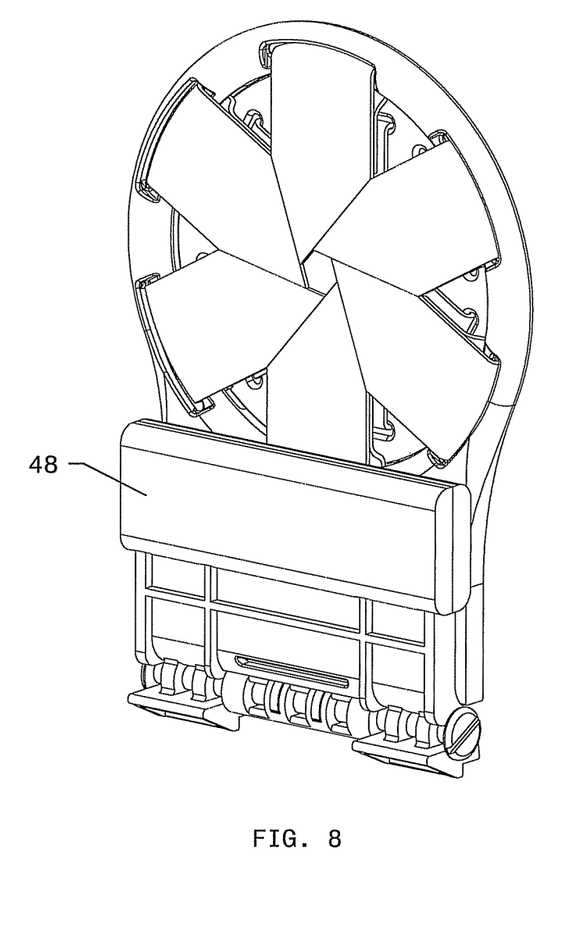
FIG. 8 is an isometric top, left and front view of the holder in a collapsed position in accordance with a preferred embodiment.

The extension assembly 20, when in an open position, as shown, for example, in FIGS. 1 & 2, extends generally perpendicularly from the insertion portion 18. In the preferred embodiment, the extension assembly 20 comprises an opening defining an upper rim 72 of a receptacle 70 adapted to retain a beverage container 74 (FIG. 2). In one embodiment, the rim 72 comprises slits 76 through which straps 78 may be threaded to form a receptacle sides. A receptacle base 80 comprising slits 76 may be threaded with portion of the straps 78 as shown in FIG. 1. Referring to FIG. 7, in a preferred embodiment, a lower surface of the receptacle rim 72 comprises cooperative coupling elements 82 which permit the base 80 to be snapped into place in a compact position (FIGS. 7 & 8). Such cooperative coupling elements 82 comprise rounded hooks 82, an open end of which faces a towards a center portion of rim 72 and when the receptacle base 80 is moved adjacent to the rim 72, secure the receptacle base 80 in position. The receptacle base 80 is formed from a rigid, yet slightly flexible material such that when pressed against the hooks 82, the base 80 deforms slightly to permit the base 80 to enter the space defined by the hooks 82 and lower surface of the rim 72.

The receptacle straps 78 comprise receptacle sides 78. The sides 78 may be formed from fabric, or a rigid yet flexible material such as leather, plastic, vinyl, and the like. In another embodiment, the receptacle sides 78 are formed from a mesh fabric.

Referring to FIGS. 3, 4, & 6, in the preferred embodiment, the channel 16 is a generally horizontal "C" channel 16. The channel 16 comprises a forward wall 84, and upper wall 86 and a lower wall 88. The upper and lower walls 86, 88 further comprise curved portions 90 which extend towards one another for a short distance and then towards the forward wall 84 defining a "J" or reverse "J" shape when viewed from the side. As shown in FIGS. 2, 3, & 4, in a preferred embodiment, the channel 16 is coupled to a surface 92, such as a bleacher back 92. However, the holder 14 is not limited to being attached to a bleacher 92 "C" channel 16. Nor is the holder 14 limited for use with beverages 74 and food items 74. Rather, the holder 14 and system 12 are equally well suited to be attached to different shaped channels 16 in different environments. In some embodiments, the channel 16 may be attached to a surface 92 such as a wall and the holder 14 may be attached to this channel 16 to secure objects such as tools. In this embodiment, for example, the channel 16 may be mounted to wall 92 of a garage. One or more holders 14 may then be inserted within the channel 16 to hold such tools as screw drivers, pliers, hammers, and the like.

In other embodiments, the channel 16 can be mounted to a kitchen wall 92 and the holder 14 may form a shelf for display or positioning of such objects as china, dishes, glasses, cups, saucers, and the like.

Referring to FIG. 6, in another embodiment, the holder 14 comprises an insertion portion 18 comprising an exterior convex spring element 30, a ledge element 104, and a rounded lower and rear surface 100. The convex spring element 30 comprises ends 102 coupled to outside surfaces of the ledge element 104 and bows upward such that a space 106 is defined below the convex spring element 30 and the ledge 104. Insertion of insertion portion 18 within the channel 16 creates a similar compression of the insertion portion 18 as described with respect to other embodiments. However, in this embodiment, the insertion portion 18 compression is caused by downward movement of the convex spring element 30 when the convex spring element 30 is pressed against the inner surface of upper wall 86 as a result of the rounded lower and rear surface 100 being pressed against the curved portion 90 of the lower wall 88. The ledge element 104 of this embodiment extends at approximately a right angle from a forward surface 108 of insertion portion 18 such that the ledge element 104 outside configuration conforms to the space created by the upper wall 86, curved portion 90 of upper wall 86, and the forward wall 84. When positioned within the channel 16, ledge 104, together with notch 44, helps prevent the holder 14 from being unintentionally removed from the channel 16.

Referring to FIGS. 3 & 4, in operation, the holder 14 is inserted within channel 16 by inserting insertion portion 18 within the upper portion 96 of the channel 16 such that an upper surface 94 of the insertion portion 18 is positioned within a portion of the channel 16 defined by the upper and lower walls 86, 88 and the curved portion 90 of the upper wall 86. Angled member 40 of the insertion portion base 42 is pressed against the curved portion 90 of the lower wall 88 such that the sliding member 22 moves downward and the insertion member 18 is caused to become compressed. Continued forward movement of the insertion member 18 causes the insertion portion 18 to be positioned within the channel 16. Once the insertion portion 18 is wholly within the channel 16, the sliding member 22 is released from compression and is confined within channel 16. The insertion member 18 may then be moved horizontally to a desired position within the channel 16. When engaged within the channel 16, the notch 44 prevents the insertion portion 18 from becoming unintentionally dislodged from the channel 16.

The insertion portion 18 is removed from the channel 16 by grasping the receptacle rim 72 and pulling it slightly upward and away from the channel 16, such action causing the insertion portion 18 to become compressed while at the same time causing angled portion 40 notch 44 to be raised to a position above the curved portion 90 of the lower wall 88 and permitting the insertion portion 18 to exit the channel 16.

Referring to FIGS. 7 & 8, the holder 14 may be collapsed by moving receptacle base 80 to a position adjacent to the rim 72 such that portions of an outer perimeter 98 of the receptacle base 80 are confined within a space defined by the rounded hooks 82 of rim. Insertion assembly 18 and extension assembly 20 are pivoted towards each other, such that front face 46 of the sliding portion 22 is adjacent to the upper surface 68 of extension assembly 22.

The present invention provides a method of retaining a container 74 such as a beverage container 74. The method comprises the steps of providing a channel 16; providing a holder 14 comprising an insertion portion 18 and an extension portion 20, the extension portion 20 comprising a receptacle 70 adapted to receive the container 74; the channel 16 being adapted to removably receive the insertion portion 18 of the holder 14; the insertion portion 18 being deformable such that when the deformable insertion portion 18 is in a contracted position, it may be inserted within the channel 16 and upon insertion within the channel 16 expands to an expanded position such that the insertion portion 18 is retained within the channel 16; and placing the container 74 within the receptacle 70.

In some embodiments of the method, the holder 14 comprises a spring arrangement 28 comprising spring elements 30. In some embodiments, such spring arrangement 28 comprises curved portions. In other embodiments, such spring arrangement 28 comprises a convex spring element 30. In other embodiments, the holder 14 comprises coil springs, bell springs, leaf springs, and other conventional and commercially available springs.

In some embodiments of the method, the channel 16 may be coupled to a surface 92 such as a wall and the holder 14 may be coupled to this channel 16 to secure objects such as tools. In this embodiment, for example, the channel 16 may be mounted to wall 92 of a garage. One or more holders 14 may then be inserted within the channel 16 to hold such tools as screw drivers, pliers, hammers, and the like.

In other embodiments of the method, the channel 16 may be mounted to a kitchen wall 92 and the holder 14 may form a shelf for display or positioning of such objects as china, dishes, glasses, cups, saucers, and the like.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure, to which it is fairly, legally, and equitably entitled to be interpreted.

We claim:

1. A receptacle positioning system for positioning a receptacle, the system comprising:
   a holder and a channel;
   the holder comprising an insertion portion, an extension portion, and said receptacle, the extension portion being positioned between said insertion portion and said receptacle, said receptacle comprising a rounded rim and a base, the rim and base being coupled by one or more straps, the receptacle comprising detents for coupling to portions of a perimeter of said base such that said receptacle is collapsible;
   the channel comprising upper, lower, rear, and forward portions;
   said upper and lower portions extending from said rear portion;
   said forward portions extending from said upper and lower portions;
   the channel further comprising a space, said space being defined by said upper, lower, rear, and forward portions;
   the insertion portion being deformable such that it may be placed in a contracted position and an expanded position such that when in said contracted position, the insertion portion is adapted for being positioned within a portion of said space, and when in said expanded position, the insertion portion is adapted for being retained within a portion of said space such that portions of the insertion portion are positioned between said forward portions and rear portion;
   the insertion portion further comprising an angled ramp; and
   wherein said receptacle is adapted to receive an object.

* * * * *